T. FOWLER.
BINDING GRAIN.

No. 103,861. Patented June 7, 1870.

Witnesses.
Chas. C. Wilson
Edmund Masson

Thaddeus Fowler.
By Atty A. B. Stoughton.

United States Patent Office.

THADDEUS FOWLER, OF TOTTENSVILLE, NEW YORK.

Letters Patent No. 103,861, dated June 7, 1870.

IMPROVEMENT IN MACHINES FOR BINDING GRAIN.

The Schedule referred to in these Letters Patent and making part of the same

*To all whom it may concern:*

Be it known that I, THADDEUS FOWLER, of Tottensville, in the county of Richmond and State of New York, have invented certain new and useful Improvements in Machines for Binding Grain, Straw, Hay, or other Material, into Bundles, Bales, or Sheaves; and I do hereby declare the following to be a full, clear, and exact description of the same, reference being had to the accompanying drawings making a part of this specification, in which—

Similar letters of reference, where they occur in the separate figures, denote like parts of the machine in all of the drawings.

Figure 1:
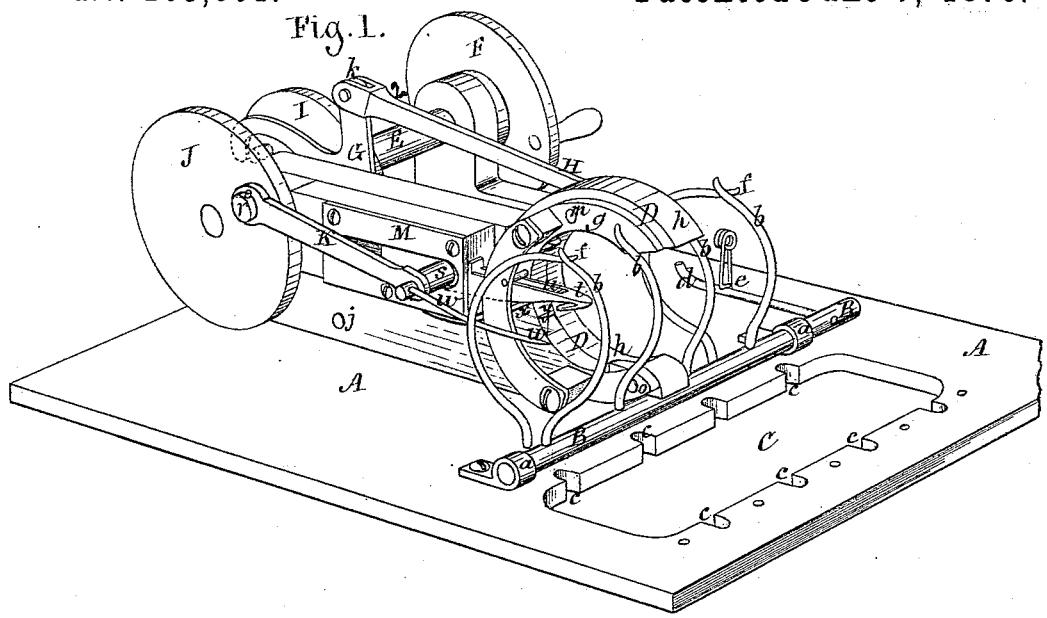
Figure 1 represents a perspective of the machine.

My invention consists, first, in a sectional holding-head, wherein a bundle of grain may be held and intermittently rotated by a reciprocating movement of one of the sections, the other being stationary; and My invention further consists in combining with the reciprocating section of a holding-head a spear or fork, which holds the bundle when the head moves in a backward direction, to prevent the bundle from moving back with said head, and releases the bundle when it is to be turned in the act of being bound, and allows it to turn or move with said head; and My invention further consists in combining with the mechanism which holds and turns the bundle of material that is to be bound, a reciprocating hook that is driven into the material, and draws therefrom a loop which, in their series capacity, are interlocked or interlooped to form the band or binding of the bundle; and My invention further consists in combining with the holding-head a hook for drawing out loops from a bundle of grain, straw, or other material, and a cast-off for throwing the loops off from the hook when they have been interlocked or interlooped with the preceding loop.

To enable others skilled in the art to make and use my invention, I will proceed to describe the same with reference to the drawings.

A represents a base or platform for carrying the binding mechanism, which may be connected to any reaping or mowing-machine, and be driven from the main driving or carrying-wheels thereof, if so desired.

The shaft B, which is hung in bearings *a a* secured to the bed A, is furnished with a series of curved fingers, *b b*, which, when down to receive a charge of grain or other article to be bound, may drop into the opening C in the bed, and rest in the recesses *c c c*, in or near the margins of said opening.

In the shaft, or to it, is fastened a lever, *d*, by which it and its fingers may be moved, as may be required, and connected with this lever *d* there is a spring-catch, *e*, for holding it and the shaft and fingers when a charge of grain is brought up to be bound.

In connection with the moving fingers *b* there are stationary ones, *f*, on the base, against which the grain is brought and held, and formed into a sheaf or bundle.

On the base is arranged a segmental and sectional holding and turning-head, D, of which the section *g* is capable of moving in its own arc, and upon the other section *h*, which is immovable. This segmental head or ring receives the bundle of grain brought up and into it by the fingers *b*, and is located about at the middle, in length, of the bundle, and at or near where the binding is done.

A shaft, E, hung in bearings on the bed or base A, and turned by any of the driving-gear of a reaping-machine if the binding is done automatically, or by the crank-wheel F if worked by hand, has a wheel or disk, I, upon it, which carries a stud, *i*, that can be made adjustable therein.

This stud works in connection with a branched arm or lever, G, pivoted to the frame at *j*, and gives said arm its vibrating motion.

From the arm *k* of this lever G a connecting-rod, H, extends forward to and connects with a wrist, *m*, that is attached to the moving section *g* of the holding and turning-head D, but passes through a curved slot, *l*, made in the stationary part *h* of said head, and moves through said slot.

There is another curved slot, *n*, in the lower part of the section *h*, through which a guide-pin, *o*, passes, and then unites with the movable part *g*. This is designed to guide the moving part on the stationary part of the head. Shouldered ways may also be made on the two sections *g h*, to steady and control the moving section.

The rotation of the wheel I first brings its stud *i* against the curved part *p* of the lever G, and drives said lever toward the binding mechanism; then, continuing its rotation, it strikes against the bent end of the branch *q* of said lever, and draws the latter away from the binding devices, and this alternating motion of the lever G works the movable section *g* of the holding-head.

The shaft E has also upon it a wrist-wheel, J, to a wrist, *r*, in which is attached one end of a connecting-rod, K, the other end whereof is attached to a stud, *s*, which is set in the heel or stock L of a hook, *t*, that is thus moved back and forth in suitable ways M M on the frame.

This hook *t* has connected to or with it a cast-off, *u*, that is vibrated on its pivoted point *v* as it performs its duties, and as will be explained in connection with the operation.

The stud *s* carries one or more prongs or tines *w*, which may extend as far out or somewhat farther out than the point of the hook $t$, with which it moves.

$x$ is a tripper, against which the cast-off $u$ pivoted to the hook strikes as the latter moves out and in, and $y$ are shoulders on the movable section $g$, to hold and turn the sheaf or bundle in one direction with said head, while the tine or tines $w$ which are in the bundle or sheaf when said head or section is returning so as to perform the next turning operation, holds said sheaf or bundle from backing with said section. Thus the sheaf or bundle is turned step by step in a forward direction, but is held against any rearward motion.

Figure 2:
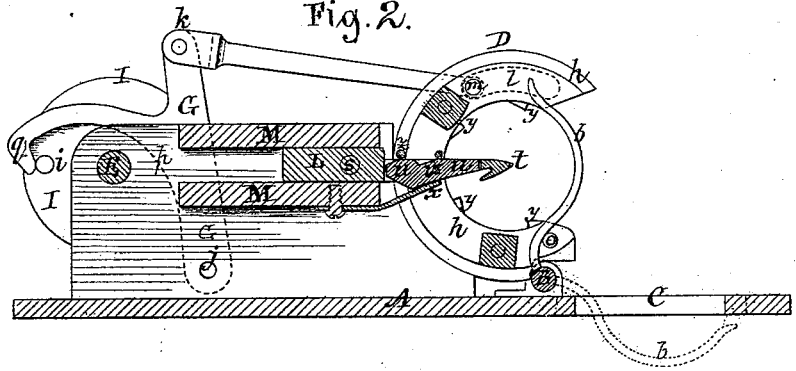
Figures 2 and 3 represent sectional elevations of the machine, with its parts in different working positions.
Figure 3:
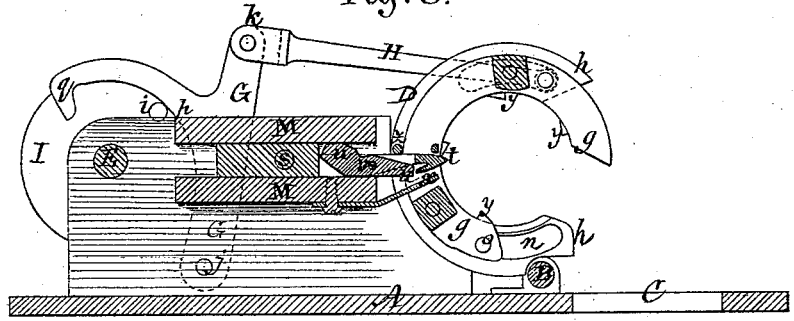

A pin, $z_1$ set in the stationary part of the head, vibrates the cast-off $u$ as it traverses past it, and causes it first to move up from the shoulder of the hook $t$, so that the hook may seize a tuft of the straw from the interior of the bundle and draw it out therefrom in a loop, and then the cast-off throws off said loop from the hook, and the tripper or guard $x$ insures its leaving the hook. The pin $z$ throws the point of the cast-off up, as in fig. 2, and the way M throws the point down, as in fig. 3.

The operation of the machine is substantially as follows:

Suppose a gavel or sheaf of grain to be gathered up into the head D and held there by the fingers $b$ $f$, the turning of the shaft E drives the hook $t$, as well as the tine or tines $w$, into the sheaf a suitable distance, and is then drawn out with a portion of the straw upon it; then the bundle turns a portion of a revolution, sufficient to make a loop, which remains on the hook. The hook is again pushed into the bundle, and takes and draws out another tuft, and its entrance into the bundle pushes the first loop back onto the shank of hook. When the hook is drawn out with the second loop or tuft upon it, the "cast-off" forces the first look over or off of the end of the hook, and forms a lock with the second one. The hook now enters the bundles and withdraws another tuft, another loop is formed, and the second one is cast off, and locking with the third one, and so on to the place of beginning or a few loops beyond that point, so as to fasten the series of loops, or the last loop may be stuck into the bundle to hold it from becoming undone.

When the stitching or interlocking of the loops has been carried around far enough, the clamp may be opened and the hook will push out the bundle, and of course the operation on that bundle ceases.

The hook, owing to the turning of the sheaf or bundle, drives through its previously drawn out loop, but into a new place in the sheaf, and so drawing out loop after loop, and, drawing the last made one through the preceding one, it loops these tufts one into the other, their butts and heads remaining clamped in the bundles, until this series of loops extends clear around to the place of beginning, or even farther, to fasten the loops there.

It is a system of rough sewing wherein the hook (needle) draws its thread from the material that is being bound up or banded by such sewing, and passes one loop through another to form the series of locked loops or stitches.

Having thus fully described my invention, and shown how the same is operated,

What I claim therein is—

In a binding apparatus, substantially as specified, a holding-head composed of two sections, one of which is movable upon the other, for the purpose of holding, turning, and releasing a bundle of grain, in the manner and for the purpose substantially as described.

Also, in combination with the preceding, a spear, fork, or tine, which holds the bundle when the head moves in a backward direction, to prevent the bundle from moving back with it, but is out of the way when the bundle is to be turned in a forward direction, substantially as described.

Also, in combination with the mechanism which holds and turns the bundle, a reciprocating hook that is driven into the material to be bound, and draws threfrom, and through a preceding loop, a looped tuft, which, in their series capacity, so interlocked or interlooped, forms a band for binding said bundle, substantially as described.

Also, in combination with the holding-head, a hook for drawing out looped tufts or bunches from a bundle of grain, straw, or other material, and a cast-off for throwing said loops or tufts off from the hook, when they have been interlocked or interlooped with the previously made loop, substantially as described.

THADDEUS FOWLER.

Witnesses:
A. B. STOUGHTON,
EDMUND MASSON.